United States Patent [19]

Smith, Jr.

[11] Patent Number: 4,706,454
[45] Date of Patent: Nov. 17, 1987

[54] VEHICLE ANTI-POLLUTION EXHAUST DEVICE

[75] Inventor: Johnny M. Smith, Jr., 2957 Bridgeport, Anaheim, Calif. 92805

[73] Assignee: Johnny M. Smith, Jr., Anaheim, Calif.

[21] Appl. No.: 824,847

[22] Filed: Jan. 31, 1986

[51] Int. Cl.$^4$ .............................................. F01N 3/02
[52] U.S. Cl. ...................... 60/274; 60/311; 60/902; 55/98; 55/325; 55/330; 55/395; 55/DIG. 30
[58] Field of Search ............... 60/311, 288, 902, 297, 60/274; 55/97, 98, 325, 330, 394, 395DIG. 30, 434

[56] References Cited

U.S. PATENT DOCUMENTS

| | | |
|---|---|---|
| 867,973 | 10/1907 | Hoover . |
| 1,169,734 | 1/1916 | Priest . |
| 1,985,713 | 12/1934 | Bartlett . |
| 2,038,313 | 4/1936 | Placko ................................. 60/297 |
| 2,372,765 | 4/1945 | Collier, Jr. . |
| 2,789,032 | 4/1957 | Bagley et al. . |
| 2,792,909 | 5/1957 | Court . |
| 2,911,289 | 11/1959 | Forry . |
| 3,083,524 | 4/1963 | Dosie . |
| 3,220,794 | 11/1965 | Stiles . |
| 3,232,373 | 2/1966 | Bjork . |
| 3,365,863 | 1/1968 | Greipel et al. . |
| 3,376,695 | 4/1968 | Muckley . |
| 3,421,315 | 1/1969 | Aoi ...................................... 60/297 |
| 3,485,593 | 12/1969 | Lenane et al. . |
| 3,495,950 | 2/1970 | Barber et al. . |
| 3,593,499 | 7/1971 | Kile . |
| 3,633,343 | 1/1972 | Mark ..................................... 60/311 |
| 3,744,249 | 7/1973 | August ................................. 60/288 |
| 3,966,443 | 6/1976 | Okano ................................. 60/311 |
| 3,969,480 | 7/1976 | Fedor et al. . |
| 4,042,355 | 8/1977 | Pearson . |
| 4,047,895 | 9/1977 | Urban . |

FOREIGN PATENT DOCUMENTS

| | | | |
|---|---|---|---|
| 2845928 | 5/1979 | Fed. Rep. of Germany ........ | 60/297 |
| 412560 | 1/1946 | Italy ..................................... | 60/902 |

Primary Examiner—Douglas Hart
Attorney, Agent, or Firm—Knobbe, Martens, Olson & Bear

[57] ABSTRACT

An exhaust filter for internal combustion engines enabling the gradual filtration of the exhaust gas to minimize pressure drop through the filter is provided. A second exhaust gas passageway within the filter gradually receives the exhaust gas from the first and primary exhaust gas passageway, and after filtration, the diverted exhaust gas gradually is returned to the primary passageway for discharge from the exhaust filter.

12 Claims, 4 Drawing Figures

U.S. Patent    Nov. 17, 1987    4,706,454
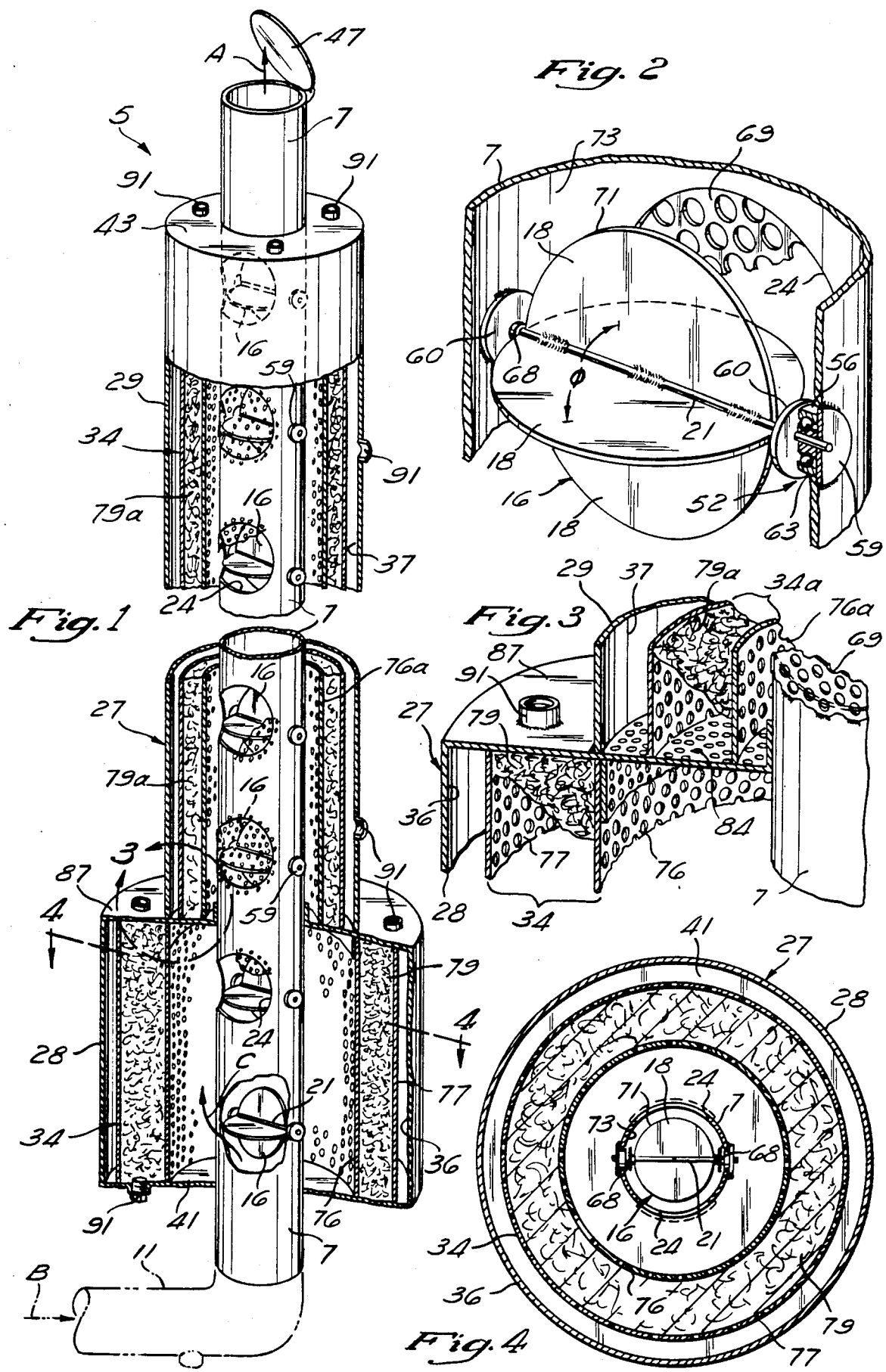

VEHICLE ANTI-POLLUTION EXHAUST DEVICE

BACKGROUND OF THE INVENTION

Field of the Invention

The present invention relates to anti-pollution devices for internal combustion engine exhaust, and more particularly to filters that utilize catalytic beds, through which the exhaust gases pass, in order to filter the gas for particulates and to complete the combustion process, eliminating many of the harmful combustion by-products from the exhaust stream before discharge to the environment.

Description of the Prior Art

Internal combustion engines, whether diesel or gasoline, generally operate at fuel-to-air mixtures that are greater than stoichiometric. The resultant exhaust gases contain varying amounts of partial combustion products, such as carbon monoxide, unburned hydrocarbons, nitrogen oxides, particulates, and other minor constituents. Almost all of these by-products have an adverse impact on the environment. Beginning in the 1960's, much work has been done in an attempt to reduce or eliminate these by-products from the exhaust stream.

Although much effort has been made to improve the efficiency of the combustion process itself, it remains necessary to supply more fuel for combustion than would be necessary if perfect mixing and burning occurred. To meet the increasingly more stringent clean air statutes, it has therefore also been necessary to provide a post-combustion treatment of the exhaust gases.

Initial efforts in post-treatment have focused on known techniques, such as direct flame oxidation of exhaust gas and the use of cyclone separators and filters for removing particulates. As a practical matter, these devices are more useful in the commercial and manufacturing setting, and are too complex and costly for incorporating into the primary sources of exhaust gases, automobiles and trucks. In recognition of these limitations, present technology and future development work have both focused on the use of catalytic mufflers and converters for oxidizing the various exhaust by-products.

Diesel engines are more efficient and complete-burning than gasoline engines. Clean-air regulations have to date not included the emissions from diesel engines within their area of impact. However, the particulate and nitrous oxide discharge levels of diesel engines pose an increasingly difficult problem as their popularity has grown, and it is expected that diesel engines will soon also be subject to emission reduction requirements. Diesel emissions have always posed a problem in underground mines, and various exhaust gas filters have been proposed to remove such emissions, for example the filters of Bagley, et al., U.S. Pat. No. 2,789,032, and of Forry, U.S. Pat. No. 2,911,289.

The mufflers and converters used with gasoline-powered engines also have adopted a wide variety of shapes and mechanisms for operation. The straight-forward approach is shown in Stiles, U.S. Pat. No. 3,220,794, wherein the cylinder through which the exhaust gases are passed is solidly packed with a catalytic material. Other systems create a network of baffles and passageways, such as is shown by Greipel, et al., U.S. Pat. No. 3,365,863, through which the exhaust gases pass as part of the cleansing process. The resistance to air flow caused by the packing material and the circuitous baffle passageways result in the generation of significant pressure drops through the exhaust device. Such resistance to air flow causes "back pressure" to applied to the engine, resulting in an adverse effect on engine performance.

In order to minimize the flow resistance through the exhaust filter and muffler, a central tube formed by the catalyst-supporting substrate is provided in Barber, et al., U.S. Pat. No. 3,495,950 (Col. 8, Lines 60-74). The catalytic material is supported by a mass of fibrous material that has been twisted to impart a helical configuration to the mass. A portion of the gases flowing through the linear passageway is diverted to flow through the helical, filtering pathways of the fibrous material. To increase the amount of gas diverted through the helical pathways, the fibrous material is formed into sections with alternating twists applied to adjacent sections, providing contrasting helix angles to disrupt the air flow.

More positive mechanisms for distributing exhaust gases through a muffler or converter have also been used. For example, fans and various other types of impeller mechanisms have commonly been used in connection with exhaust gas treatment, either to assist in the actual filtering process, or as merely energy dissipation devices as in Collier, Jr., U.S. Pat. No. 2,372,765. In Muckley, U.S. Pat. No. 3,376,695, a fan 34 is rotated by the flow of exhaust gases, and is used to direct the gases towards a removable filter cartridge 22. Here also, the extent to which the flowing exhaust gases can be used to generate the motive power for forcing the gases through a filter is governed by the amount of back pressure permissible before engine performance suffers. To lessen the back pressure problem, Kile, U.S. Pat. No. 3,593,499, utilizes a powered fan located either before or after the filter element to push (or pull) the exhaust gases through the filter element.

The spinning turbine provided in Court, U.S. Pat. No. 2,792,909, is used to both spin a centrifugal filter element and to deflect the exhaust gases into an outlet 6. A similar type of deflection and rotational generating system is utilized by Urban, U.S. Pat. No. 4,047,895, in which the rotation produced by the flowing exhaust gases is used to rotate the filter medium through a reconditioning mode to prolong the life of the filter system.

In each of the fan-powered systems, there is essentially only one gas flow path with a gas treatment structure placed somewhere therein. Thus, even the fan-powered systems have the back pressure problems associated with restricted flow paths. This is particularly the case where the velocity of the exhaust gases is used to power the impeller. Moreover, even when an outside power source is utilized, the concentration of gas treatment at a single location rather over an extended area as in the Barber, et al., muffler, can lead to plugging problems in addition to mass and heat transfer problems due to the number of chemical reactions forced to occur over a limited area.

SUMMARY OF THE INVENTION

The present invention has as an underlying objective the improvement in exhaust filters by the provision of such a filter that increases the surface area over which filtration occurs in a manner that does not require a significant increase in the size of the filtering device. A further objective of the present invention is to provide such filtration for a high volume air flow without obtaining a level of flow resistance or back pressure sufficient to impair engine performance.

This goal is inventively achieved by providing an exhaust filter having two air flow paths in parallel, a through-passage and a filtered flow path. In compact form, this filter consists of a central pipe passing through one or more annular canisters, with the exhaust gases passing from the central pipe out to the canister for filtration before returning once again to the central pipe prior to being exhausted.

More specifically, during operation of the inventive exhaust filter, the exhaust gases from an engine manifold enter the filter through a central pipe and impinge upon a rotatable baffle, causing the baffle to spin and a portion of the exhaust gases to pass transversely from the central pipe, through openings in the central pipe wall opposite the baffle, into a surrounding annular space within the canister. A portion of the gases leaving the central pipe will pass through a surrounding annular filter located within the canister. The remainder of the gases that leaving the central pipe flow parallel to the central pipe in an annular chamber between the central pipe and the filter.

In the preferred embodiment, a series of the rotatable baffles are spaced along the interior passage of the central pipe. Thus, the gases that pass by the first baffle and continue in the central pipe impinge upon the next rotatable baffle, etc., Gases may also re-enter the central pipe through openings opposite the subsequent baffles. The flow rates are such that the exhaust gases will be turbulently swirling throughout the canisters, with rapid commingling of filtered and unfiltered gases.

In the preferred embodiment, there are two canisters connected end-to-end along the pipe, to provide a two-stage filter. Both the first-stage and the second-stage filters are formed as annular filters located parallel to, and spaced-apart from, the central pipe, within their respective canisters. These canisters surround and enclose both the filter and the central pipe. The gases passing through the first stage filter are forced into the second stage filter, downstream of the first-stage filter. After passing through the second stage, all of the filtered gases return to the central pipe and are then discharged into the environment.

As discussed previously, a portion of that exhaust gases is forced out of the central pipe by the rotating baffles for passage through the annular filter or filters. The remaining exhaust gases continue to flow through the central pipe, passing around and through the spinning baffle. A third air stream is also formed by this baffle mechanism, and consists of gases that are returning to the central pipe from the surrounding outer canister. By spacing the baffles along the central pipe, and by having one or more annular filters also located along the central pipe, the exhaust gases are distributed along the filter according to pressure differences and gas flow rates in a manner that permits efficient filtration yet minimizes flow resistance, noise and the generation of back pressure.

Various other objects, advantages, and features of the present invention will become readily apparent from the ensuing detailed description, and the novel features will be particularly pointed out in the appended claims.

BRIEF DESCRIPTION OF THE DRAWINGS

FIG. 1 is a perspective view in elevation with portions removed, portions broken away, portions in section, and portions in phantom, showing an exhaust filter according to the present invention;

FIG. 2 is a partial perspective view, with portions in section and portions broken away, showing a baffle spinner unit according to the present invention;

FIG. 3 is an enlarged perspective view, with portions in section and portions broken away, taken substantially of that portion of the filter within the circle -3- of FIG. 1, showing the filter canisters according to the present invention; and FIG. 4 is a top plan view in section, taken substantially along the line 4—4 of FIG. 1, showing the annular construction of the exhaust filter according to the present invention.

DESCRIPTION OF THE PREFERRED EMBODIMENT

FIG. 1 shows an exhaust filter 5 for filtering particles and noxious emissions from the exhaust generated by internal combustion engines, particularly, diesel, engines (not shown). A central pipe 7 forms the primary air passageway for the exhaust gases, which are received from an engine through an exhaust manifold 11 (a portion thereof shown in phantom). A plurality of baffle spinners 16 are located within the central pipe 7 and are separated from one another in a manner creating a linear array of the baffle spinners 16. As best shown by reference to FIG. 2, each baffle spinner 16 consists of a plurality of baffle plates 18 attached to a central shaft 21. The individual plates 18 are semi-circular in shape and are of a radius smaller than the central pipe 7 to permit rotation of the baffle plates 18 about an axis of rotation formed by the central shaft 21. Adjacent to each of the baffle spinners 16, as is best shown in FIG. 4, an opposed pair of discharge openings 24 formed in the central pipe 7 are provided for each of the baffle spinners 16. Each opening is preferably circular and of a diameter about equal to that of the baffle spinners 16.

Returning to FIG. 1, that portion of the central pipe 7 containing the baffle spinners 16 and the discharge openings 24 lies within a housing formed by a first canister 28 and a second canister 29. The first and second canisters 28, 29 are joined together in an end-to-end manner to create a unitary housing 27 within which the filtration and catalytic treatment occurs.

The first and the second canisters 28, 29 both include a filter matrix 34, which is located within each respective canister between the central pipe 7 and an outer wall 36 of the first canister 28 or an outer wall 37 of the second canister 29, as the case may be. A first end plate 41 seals and encloses the interior portions of the first canister 28 and a second end plate 43 likewise seals and encloses the second canister 29. As connected together to form the housing 27, the first and the second end plates 41, 43, together with the first and the second outer walls 36, 37, create an annular enclosed chamber surrounding the central pipe 7. An optional protective cover 47 completes the exhaust filter 5, the protective cover 47 is attached to the central pipe 7 in a conventional manner whereby the protective cover 47 is biased towards a position closing off the central pipe 7 to prevent potentially harmful debris from entering the exhaust filter 5 when the internal combustion engine is not in operation. The mechanism biasing the protective cover 47 in a closed position is designed so that the flow of exhaust air applies sufficient force to cause the protective cover to open position and permit the flow of exhaust air through the filter 5.

In the preferred embodiment, the central pipe 7 has a length of at least five feet (1.5 meters) with a four-inch (10 cm) inner diameter. Due to the harsh environment, steel, and particularly stainless steel, is the material of choice, with a stainless steel having a thickness of between ⅛-3/16-inch (3-5 mm) being appropriate for all outer walls and inner pipes for treating this type of an exhaust airstream. The first canister 28, having a larger diameter than the second canister 29, is conveniently constructed of a 12-inch (30 cm) steel-walled casing with the first end plate 41 consisting of a 12-inch (30 cm) bottom steel plate fastened to the outer casing and to the central pipe 7, with welding being the attachment method of choice. In a like manner, the second canister 29 is constructed of an 8-inch (20 cm) steel walled casing with the second end plate 43 likewise constructed of an 8-inch (20 cm) steel plate welded to the casing and to the central pipe 7 projecting therethrough. For both of the canisters 28, 29, the thickness of the casing and the plates is a matter of design choice, with a thickness of between ⅛-3/16 inch (3-5 mm) used in a preferred embodiment.

The length of each of the canisters 28, 29 is also a matter of design choice, depending upon the application and filtration material used. However, in the preferred embodiment, the first canister 28 has a length of one foot (30 cm) and the second canister 29 has a length of 2½ feet (76 cm). Although not essential to the practice of the present invention, it is also desirable to provide a length of the central pipe 7 that projects free and clear from the second canister 29, with six inches (15 cm) of projection being the minimum desirable length.

The exhaust air stream flowing through the central pipe 7 deflects the baffle plates 18, causing the rapid rotation of each of the baffle spinners 16 about their central shafts 21. As best shown in FIG. 2, a pair of support bearings 52 rotatably support the central shaft 21 within the central pipe 7. The support bearings 52 may be of any conventional design suitable for the hostile environment of this application, however, as is shown in FIG. 2, in the preferred embodiment an outer sandwich construction is provided to obtain the additional protection deemed necessary due to the high temperatures of the exhaust gases passing through the central pipe 7.

A conventional two-raceway ball bearing unit is placed within an outer bearing sleeve 56, which is in turn sandwiched between and attached to an outer protective washer 59 and an inner protective washer 60. In addition to retaining the support bearings 52 in place within the central pipe 7, and protecting the inner ball bearing raceway from mechanical damage, the inner protective washers 60 also protect the enclosed ball bearing unit from structural damage due to the high temperature of the exhaust gases, which may approach or be in excess of 1200° F. (650° C.). The outer bearing sleeve 56 is attached, preferably by welding, to both of the protective washers 59, 60. The sandwiched bearing unit is then placed in a bearing opening 63 formed in the central pipe 7. The bearing openings 63 is substantially equal in diameter to that of the inner and outer protective washers 59, 60 to simplify its installation therein. The outer bearing sleeve 56 is then attached to the central pipe 7 in a conventional manner, such as by welding, to anchor the support bearing 52 to the central pipe 7. The central shaft 21 is thus rotatably supported within the central pipe 7.

In addition to this rotatable mounting, the central shaft 21 remains somewhat loose within the support bearing 52, with a limited amount of back-and-forth lateral movement, parallel to the axis of rotation allowed to ensure the free and rapid rotation of the baffle plates 18 about the central shaft 21 during operation. The bearings themselves are sufficiently open to the interior of the central pipe 7, due to the loose fit of the central shaft 21 within the support bearings 52, to permit the carbonaceous by-products in the exhaust airstream to lubricate the bearings. The extent of lateral movement is controlled by a pair of limit washers 68 attached, such as by welding, to the central shaft 21 adjacent to the baffle plates 18. In addition to restricting the lateral movement of the central shaft 21, the limit washers 68 also prevent the edges of the baffle plates 18 from seizing on or scouring the inner protective washers 60 when the central shaft 21 reaches a limit of lateral movement.

In the preferred embodiment, the baffle spinners 16 consist of four 1/32" thick (0.8 mm) steel plates, each forming one-half of a three and one-half inch (9 cm) in diameter circle. Each half-circle plate has been attached, preferably by welding, to the central shaft 21, which may appropriately consist of a ¼" (6 mm) steel shaft of approximately 5" (13 cm) in length. Each of the baffle plates 18 are separately welded to the central shaft 21, forming an angle φ separating adjacent plates. The angle φ is also a matter of choice, however when four plates are used, as in the preferred embodiment, the angle φ may approximate 90°. The ball bearings and bearing raceways are of a conventional design, with the outer protective washer 59 and the inner protective washer 60 conveniently consisting of 1½ (4 cm) diameter steel washers that have been tack-welded to the outer bearing sleeve 56. When installed, the outer bearing sleeve 56 is likewise tack-welded to the surface of the bearing opening 63 located within the central pipe 7. The discharge openings 24 located in the central pipe 7 adjacent to the baffle spinners 16 are preferably of 3" (7.6 cm) diameter and are covered with a protective covering 69 consisting of an expanded metal sheet having an array of perforations of ⅛" (3 mm) in diameter. The expanded metal sheet is attached to the outer surface of the central pipe 7, preferably by welding.

No matter how freely the baffle spinners 16 rotate on the central shaft 21, energy is required to initiate the rotation thereof. To avoid imposing this energy requirement on an engine during the start up process, the baffle plates 18 are sized to provide a space or opening between an outer edge 71 of the baffle plate 18 and an inner surface 73 of the central pipe 7 (see FIG. 4). In the preferred embodiment, this distance is approximately ¼" (6 mm), and is sufficient to permit the initial exhaust airflow to pass around the stationary baffle plates 18.

The filter matrices 34 located within both the first canister 28 and the second canister 29 perform the majority of the filtering process within the exhaust filter 5, and their structure is best shown with reference to FIG. 3. Since the filter matrices 34 are substantially identical in both of the canisters 28, 29, the filter matrix 34 will be described by reference to the first canister 28, with the letter "a" denoting corresponding portions of the filter matrix 34a located in the second canister 37. As shown in FIG. 3, the filter matrices 34, 34a each consist of an inside perforated wall 76 and an outside perforated wall 77, with a filtration material 79 located therebetween. The perforated walls 76, 77 are such as to permit the flow of exhaust air through the perforations and into and out of the filtration material 79. In the preferred embodiment, expanded metal sheets are used to form the perforated walls 76, 77 and are constructed out of stainless steel with the perforations consisting of an array of ⅛" (3 mm) openings formed therein. The filtration material 79 can be any one of a number of different filters known to the art, and in the preferred embodiment, a filter packing formed of titanium shavings of irregular size and thickness is provided. The separation between the perforated walls 76, 77 within the first canister 28 is approximately 2 inches (5 cm) and the separation between the perforated walls 76a, 77a in the second canister 29 is approximately 1 inch (2.5 cm) for the filter matrix 34a. As is also shown in FIG. 3, a perforated separation wall 84 separates the interior portions of the first canister 28 from the interior portions of the second canister 29 in a manner permitting the free passage of exhaust air therebetween. In the preferred embodiment, the second canister 29 has a smaller diameter than does the first canister 28, and thus an outer annular plate 87 is used to seal that portion of the first canister 28 not in gas/fluid communication with the interior portions of the second canister 29 through the perforated separation wall 84. In the preferred embodiment, the outer annular plate 87 consists of a 12 inch (30 cm) steel plate and the perforated separation wall 84 consists of an expanded metal plate having an array of 1/32" (0.8 mm) perforations formed therein.

The canister/central pipe structure represents a closed system consisting of the first end plate 41; the outer walls 36, 37 of the first and second canisters 28, 29; the outer annular plate 87; and the second end plate 43. All of the exhaust air entering the interior portions of the canisters 28, 29 will thus ultimately be forced back into the central pipe 7 for subsequent discharge into the environment.

During operation of the exhaust filter 5, contaminants originally within the exhaust air gradually build up within the filter matrices 34, 34a and within the interior portions of the first and second canisters 28, 29. The exhaust filter 5 is provided with a mechanism to cleanse the interior portions of the first and second canisters 28, 29 including the filter matrices 34, 34a. A plurality of clean-out plugs 91 are provided in many locations along the outer surface of the exhaust filter 5 to cleanse the interior portion thereof. As shown in FIG. 1, locations of the clean-out plugs 91 include: the first and second end plates 41, 43; the outer annular plate 87; and the outer walls 36, 37. The clean-out plugs 91 permit the entry of pressurized air and/or liquid solvents into the canisters 28, 29 to remove the particulate build up, reactivate the catalytic surfaces, and to otherwise recondition the inventive exhaust filter 5. Depending upon the positioning of the exhaust filter 5, the remaining clean-out plugs 91 are located and arranged to permit liquid drainage, under gravity, from the exhaust filter 5 during a cleaning operation.

The present invention may be adapted to treat the exhaust gases emanating from all types and sizes of internal combustion engines, both diesel and gasoline, and for any application making use of such an engine, e.g., automobiles, trucks, portable generators, various motors used throughout oil refineries, and motors used in oil recovery systems. The design of the inventive filter device is necessarily adaptable to a wide variety of design requirements, both regarding size and with respect to the materials used for fabrication, depending upon the particular filtering application. For example, in the preferred embodiment for use in conjunction with the diesel engines of trucks and buses, internal temperatures can approach 1200° F. (650° C.), and the materials used must be capable of withstanding such a harsh environment. The preceding dimensions and materials have been provided by way of example and not by way of limitation, with the operation and cooperation of the various members during filtration being set forth in the following.

Operation of an internal combustion engine (not shown) creates a stream of exhaust air, depicted by the arrow identified by reference letter "B", that enters the central pipe 7 through the exhaust manifold 11. Upon encountering the first baffle spinner 16, a portion of the exhaust airstream B is diverted out of the discharge opening 24 and into the interior portions of the first canister 28. This deflected airstream is depicted an as arrow identified by reference letter "C" shown in FIG. 1. A portion of this diverted airstream C will then pass through the filter matrix 34 of the first canister 28, with the remaining portion of the diverted airstream remaining within the annular space located between the filter matrix 34 and the central pipe 7. In addition to providing the initial filtration, the first canister 28 also functions as a spark arrester, a function that is vital to the prevention of grassland and forest fires in many areas of the western United States.

In the preferred embodiment, multiple baffle spinners 16 are provided, and thus when the first diverted airstream C leaves the central pipe 7, the remaining portion of exhaust airstream B continues within the central pipe 7 to encounter supplemental baffle spinners 41. In each case, a further portion of the exhaust stream B will likewise be diverted into the interior portions of either the first canister 28 or the second canister 29, as the case may be. Although the baffle spinners 16 also permit the return of gases into the central pipe 7, because of exhaust gas pressures and flow rates, the initial discharge openings 24 in the central pipe 7 primarily discharge air, with very little of the diverted airstream C believed to immediately return to the central pipe 7. The predominant portion of the diverted airstream C thus remains outside of the central pipe 7, and within a second air passageway formed by the interior portions of the first canister 28 and the second canister 29. The diverted airstream C flows inside of the first canister 28, and eventually flows through the perforated separation wall 84, entering the filter matrix 34a of the second canister 29. Additional baffle spinners 16 and discharge openings 24 are provided in that portion of the central pipe 7 located within the second canister 29. The diverted, and now-filtered air gradually returns to the central pipe 7 through the additional discharge openings 24 for eventual discharge. Passage through the filter significantly reduces the level of exhaust noise as compared to its level when discharged from the engine, and preliminary testing with respect to hydrocarbon levels generated by a diesel engine of the type used in tractor-trailer rigs has obtained emissions readings of between 24–29 parts per million when utilizing filters according to the present invention.

Although the preferred embodiment depicted in the figures shows an annular construction of an inner central pipe 7 surrounded by the first canister 28 and the second canister 29, the present invention is by no means limited to such a structure, and, in fact, is susceptible to any one of a number of different designs that provide two separate flow paths and a mechanism for the progressive deflection of an airstream from one flow path to a second flow path for treatment, and then progressively back to the first flow path for discharge.

It is believed that this invention, if built to a larger scale, also can be used to reduce emmissions from the smoke stack in a coal burning power plant.

While I have disclosed an exemplary structure to illustrate the principles of the present invention, it should be understood that I wish to embody within the scope of the patent warranted hereon, all such modifications as reasonably and properly come within the scope of my contribution to the art.

I claim:

1. An exhaust filter for controlling emissions in a discharge gas stream comprising:
   an outer housing;
   a first exhaust gas passageway comprising a cylindrical pipe received within said outer housing, the pipe provided with a plurality of openings formed in an outer surface of the pipe and having a first end and a second end projecting from the housing, said cylindrical pipe receiving said discharge gas stream and defining a first fluid pathway through said outer housing for the gas stream;
   a second exhaust passageway formed within said outer housing, in fluid communication with said first passageway and defining a second fluid pathway for receiving a selected portion of said discharge gas stream passing through the first fluid pathway;
   a filter means placed within and filtering said selected portion of the discharge gas stream passing through said second fluid pathway; and
   diverting means comprising at least one baffle spinner rotatably mounted within said cylindrical pipe adjacent one of said openings formed therein, progressively diverting the discharge gas stream from the first fluid pathway to the second fluid pathway and progressively diverting the filtered discharge gas stream from the second fluid pathway to the first fluid pathway.

2. An exhaust filter as described in claim 1, wherein said outer housing comprises at least one enclosed canister having a first surface portion and a second surface portion through which said first and said second ends of the cylindrical pipe project.

3. An exhaust filter as described in claim 2, wherein said outer housing comprises a pair of enclosed canisters attached end-to-end to one another in a manner permitting gas communication between said pair of canisters.

4. An exhaust filter as described in claim 3, wherein each of said pair of canisters is provided with an outer wall that is substantially cylindrical and said first surface portion formed on said first canister and said second surface portion formed on said second canister comprise planar portions of said pair of cylindrical canisters.

5. An exhaust filter as described in claim 3, wherein said second exhaust gas passageway comprises an annular enclosure formed between an outer wall of said pair of canisters and an outer surface of said cylindrical pipe along a selected length thereof.

6. An exhaust filter as described in claim 2, wherein said plurality of openings formed in said cylindrical pipe comprise an array of opposing, linearly spaced, paired openings in the cylindrical pipe, and said diverting means comprising a plurality of said baffle spinners mounted in the cylindrical pipe, each adjacent a pair of said paired openings.

7. An exhaust filter as described in claim 6, wherein said filter means comprises a filter matrix formed within the second exhaust gas passageway.

8. An exhaust gas filter as described in claim 7, wherein said filter matrix comprises a filter material received by and contained between an inside wall and an outside wall, each of said walls mounted within said second gas passageway, and having openings formed therein of a size appropriate for the passage of gas while retaining said filter material between said inside and said outside walls.

9. An exhaust filter as described in claim 8, wherein said filter material comprises titanium shavings.

10. An improved exhaust filter of the type having an outer canister housing and a central throughbore forming a first exhaust gas passageway, wherein the improvement comprises:
    a second exhaust gas passageway enclosed within said outer canister housing in fluid communication with said central throughbore at a plurality of separate locations within said outer canister;
    airflow directing means comprising a plurality of baffle spinners rotatably mounted within the first exhaust gas passageway adjacent each of the locations wherein fluid communication occurs between the second exhaust gas passageway and the central throughbore; and
    filter means received within said second exhaust gas passageway, filtering substantially all of the exhaust gas passing therethrough.

11. An improved exhaust filter as described in claim 10, wherein said filter means comprises a filter matrix received between a pair of retaining walls having a plurality of openings formed therein suitable for the passage of gases.

12. A method for the purification of exhaust gas from an internal combustion engine comprising:
    receiving said exhaust gas from the internal combustion engine in a first exhaust gas passageway;
    progressively diverting said exhaust gas from the first exhaust gas passageway utilizing a plurality of baffle spinners rotatably mounted within the first exhaust gas passageway to a second exhaust gas passageway;
    filtering said exhaust gas while within the second exhaust gas passageway;
    progressively diverting said exhaust gas from the second exhaust gas passageway to said first exhaust gas passageway, again utilizing said plurality of baffle spinners; and
    discharging said exhaust gas from the first exhaust gas passageway into the environment after the filtration of a substantial portion of said exhaust gas.

* * * * *